United States Patent
Ahlgren et al.

(10) Patent No.: US 6,203,750 B1
(45) Date of Patent: *Mar. 20, 2001

(54) METHOD FOR MAKING A HEAT-SHRINKABLE FILM CONTAINING A LAYER OF CRYSTALLINE POLYAMIDES

(75) Inventors: Kelly R. Ahlgren; Ram K. Ramesh, both of Greenville, SC (US)

(73) Assignee: Cryovac, INC, Duncan, SC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/789,528

(22) Filed: Jan. 27, 1997

Related U.S. Application Data

(60) Division of application No. 08/480,635, filed on Jun. 7, 1995, now abandoned, which is a continuation-in-part of application No. 07/893,638, filed on Jun. 5, 1992, now abandoned.

(51) Int. Cl.[7] .............................. B29C 47/88; B29C 47/06
(52) U.S. Cl. .................... 264/514; 264/557; 264/171.28; 264/173.13
(58) Field of Search .................................. 264/514, 557, 264/171.28, 173.13

(56) References Cited

U.S. PATENT DOCUMENTS

| Re. 30,390 | 9/1980 | Kupcikevicius et al. | 17/49 |
|---|---|---|---|
| 4,098,860 | 7/1978 | Etou et al. | 264/171 |
| 4,120,928 | 10/1978 | Furukawa et al. | 264/171 |

(List continued on next page.)

FOREIGN PATENT DOCUMENTS

| 90 07 334 | 4/1991 | (DE) . |
|---|---|---|
| 0 149 321 A1 | 7/1985 | (EP) . |
| 0 170 385 | 2/1986 | (EP) . |

(List continued on next page.)

OTHER PUBLICATIONS

Journal of Polymer Science, Wild et al., vol. 20, pp. 441–455, "Determination of Branching Distributions in Polyethylene and Ethylene Copolymers".
ASTM Standard 2732, pp. 368–371, "Standard Test Method for Unrestrained Linear Thermal Shrinkage of Plastic film and Sheeting".
Dr. Siggi Schaaf, "Polyamides (Nylons) –the most important engineering plastics".
X–ray Diffraction Methods in Polymer Science, Alexander, Leroy E. John Wiley & Sons, New York, pp. 491–494, 1969.*

Primary Examiner—Jan H. Silbaugh
Assistant Examiner—Mark Eashoo
(74) Attorney, Agent, or Firm—Rupert B Hurley, Jr.

(57) ABSTRACT

A process of making a biaxially-oriented multilayer film, comprises extruding a tubular multilayer tape and inflating the tape so that the tape is biaxially oriented by stretching in the transverse direction and machine direction at the same time, so that a tubular multilayer film is formed. The tubular multilayer tape comprises: (i) a first layer comprising a composition comprising a first polyamide and at least one member selected from the group consisting of a first polyolefin and a second polyamide, wherein the first polyamide comprises at least one member selected from the group consisting of nylon 6, nylon 66, and nylon 6/66, and wherein the first polyolefin and the second polyamide each has a different crystal structure than the first polyamide, and wherein the first layer has a thickness of less than about 15 percent, based on a total thickness of the tape; (ii) a second layer comprising a second polyolefin; (iii) a third layer which is an $O_2$-barrier layer comprising at least one member selected from the group consisting of ethylene/vinyl alcohol copolymer, polyvinylidene chloride, and polyalkylene carbonate, the third film layer having a thickness of less than about 15 percent, based on a total thickness of the tape; and (iv) a fourth layer comprising a third polyolefin.

19 Claims, 1 Drawing Sheet

U.S. PATENT DOCUMENTS

Figure 1:
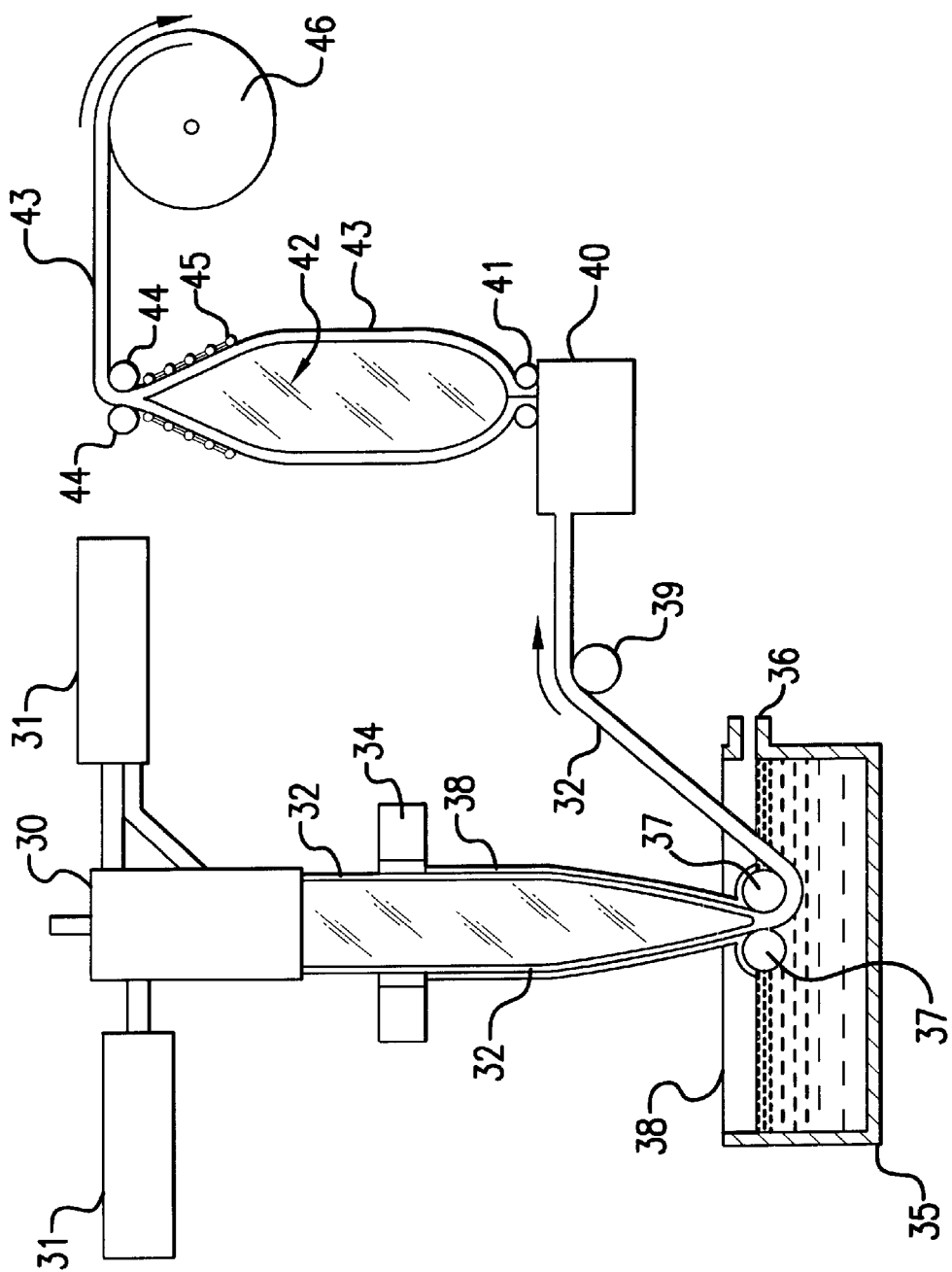

| | | | |
|---|---|---|---|
| 4,302,565 | 11/1981 | Goeke et al. | 526/88 |
| 4,302,566 | 11/1981 | Karol et al. | 526/125 |
| 4,486,507 | 12/1984 | Schumacher | 428/476.1 |
| 4,495,751 | 1/1985 | Galbiati | 53/576 |
| 4,501,798 | 2/1985 | Koschak et al. | 428/349 |
| 4,606,922 | 8/1986 | Schirmer | 426/412 |
| 4,612,221 | 9/1986 | Biel et al. | 428/35 |
| 4,647,483 | 3/1987 | Tse et al. | 428/35 |
| 4,659,599 | 4/1987 | Strutzel | 428/36 |
| 4,683,170 | 7/1987 | Tse et al. | 428/349 |
| 4,731,214 * | 3/1988 | Kondo et al. | 264/171.28 |
| 4,851,245 | 7/1989 | Hisazumi et al. | 426/105 |
| 4,855,183 | 8/1989 | Oberle | 428/345 |
| 4,888,223 | 12/1989 | Sugimoto et al. | 428/34.9 |
| 4,944,970 | 7/1990 | Stenger et al. | 428/34.8 |
| 5,077,109 | 12/1991 | Lustig et al. | 428/36.91 |
| 5,079,051 | 1/1992 | Garland et al. | 428/34.9 |
| 5,085,890 | 2/1992 | Niaura et al. | 427/149 |
| 5,094,799 | 3/1992 | Takashige et al. | 264/514 |
| 5,106,693 | 4/1992 | Harada et al. | 428/412 |
| 5,185,189 | 2/1993 | Stenger et al. | 428/34.8 |
| 5,206,075 | 4/1993 | Hodgson, Jr. | 428/216 |
| 5,206,309 | 4/1993 | Altman | 525/432 |
| 5,213,900 | 5/1993 | Friedrich | 428/474.4 |
| 5,225,139 * | 7/1993 | Wajsbrot et al. | 264/557 |
| 5,241,031 | 8/1993 | Mehta | 526/348.1 |
| 5,272,236 | 12/1993 | Lai et al. | 526/348.5 |
| 5,278,272 | 1/1994 | Lai et al. | 526/348.5 |
| 5,304,385 * | 4/1994 | Wilhoit et al. | 426/412 |
| 5,595,623 * | 1/1997 | Lulham et al. | 264/171.28 |
| 5,645,788 * | 7/1997 | Bekele | 264/171.28 |

FOREIGN PATENT DOCUMENTS

| | | |
|---|---|---|
| 0 269 325 A2 | 6/1988 | (EP) . |
| 0 325 151 | 7/1989 | (EP) . |
| 0 325 151 A2 | 7/1989 | (EP) . |
| 0 331 509 | 9/1989 | (EP) . |
| 0 331 509 A2 | 9/1989 | (EP) . |
| 0 358 038 | 3/1990 | (EP) . |
| 0 358 038 A1 | 3/1990 | (EP) . |
| 0 386 759 A2 | 9/1990 | (EP) . |
| 0 408 390 | 1/1991 | (EP) . |
| 0 451 977 A1 | 10/1991 | (EP) . |
| 0 465 931 | 1/1992 | (EP) . |
| 0 465 931 A2 | 1/1992 | (EP) . |
| 0 467 039 | 1/1992 | (EP) . |
| 0 573 306 | 12/1993 | (EP) . |
| 222632 | 7/1989 | (NZ) . |
| 232235 | 4/1991 | (NZ) . |
| WO 90/03414 | 4/1990 | (WO) . |
| WO 92/15641 | 9/1992 | (WO) . |
| WO 93/03093 | 2/1993 | (WO) . |

* cited by examiner

METHOD FOR MAKING A HEAT-SHRINKABLE FILM CONTAINING A LAYER OF CRYSTALLINE POLYAMIDES

This is a Divisional Application of application Ser. No. 08/480,635 filed Jun. 7, 1995, now abandoned, which is a Continuation-in-Part of application Ser. No. 07/893,638, filed Jun. 5, 1992, now abandoned.

FIELD OF THE INVENTION

The present invention relates generally to articles formed by hermetically sealing a film to itself, i.e., articles such as bags, casings, etc. suitable for the packaging of foods, especially meats, such as processed meat products. The present invention is especially directed to heat shrinkable, polyamide containing casings which are shirred for use as cook-in casings for the packaging of processed meat products, such as ham, turkey, bologna, etc.

BACKGROUND OF THE INVENTION

Biaxially oriented, heat shrinkable cook-in casings made from a multilayer film containing polyamide or polyester have been known for some time. Furthermore, various blends comprising polyamides and other polymers are also known for use in such cook-in casing films.

A commercially available casing used for cook-in applications has included a layer of ethylene/vinyl alcohol copolymer (EVOH), present as an $O_2$-barrier layer, this layer being outward of one or more film layers comprising one or more polyolefins. Such films have been found to be orientable and shirrable without splitting during cooking.

EVOH is known to be an expensive copolymer. Moreover, in certain end uses, such as cook-and-strip end uses, it is not necessary to provide an $O_2$-barrier layer, as the oxygen permeability during the cook-in step is not important. Thus, for cook-and-strip end use, it is desired to provide a cook-in casing which does not contain the relatively expensive EVOH layer. However, upon elimination of the EVOH layer, the inventors have discovered that a substantially 100% polyolefin casing tends to split during cook-in. It has been theorized that the reason for this splitting is that oil, which is placed on the outside of the casing during the shirring process, migrates into the film and weakens the polyolefin layers. It is believed that the EVOH layer prevented the migration of the oil to the polyolefin layers inward of the EVOH layer, and for this reason the EVOH-containing casings do not tend to split during cook-in. Nevertheless, such EVOH containing casings remain expensive and potentially unnecessary for cook-in applications, provided some way can be found to eliminate the detrimental effects of the oil on the polyolefin layers.

In an attempt to overcome the casing-splitting problem while at the same time eliminating the use of expensive EVOH in the casing, the instant inventors conceived of using a polyamide layer in place of the EVOH layer, the polyamide layer being between the oil and the polyolefin layer(s), in order to block the migration of oil and thereby reduce or eliminate the detrimental effects of the oil on the polyolefin layer(s). However, nylon 6, nylon 66, and nylon 6/66 are about the only feasible polyamides for such use, as the remaining polyamides are as expensive, or more expensive, than EVOH.

The inventors discovered that a film layer of 100% nylon 6 cannot be oriented to the degree required to provide the casing with a desirable level of heat-shrinkability, as the orientation bubble would break very frequently, rather than orient. Thus, there remains a need for an EVOH-free, relatively inexpensive article suitable for cook-in end use.

SUMMARY OF THE INVENTION

The inventors of the present invention have discovered a relatively inexpensive heat shrinkable casing suitable for cook-in end use, this casing being particularly suited for use in cook-and-strip applications. The film from which the casing is made contains a layer comprising at least two polyamides, this layer being between the oil and the polyolefin layer(s). The layer comprising at least two polyamides preferably comprises a composition comprising a first nylon which is nylon 6, nylon 66, or nylon 6/66 (or any other relatively inexpensive crystalline nylon polymer) in a relatively large amount, e.g., greater than 50 weight percent, based on the weight of the layer. It has been surprisingly discovered that by providing this composition with a second polyamide having a crystal structure which differs from the crystal structure of the first polyamide, the resulting composition can be oriented out of hot water or steam (i.e., at a temperature of from about 180° F. to 280° F., with heating taking place for a period of from about 1 to 100 seconds, as required for polyolefin-containing films), unlike a film layer comprising 100 percent of the first polyamide. Preferably, the second polyamide comprises the remainder of the first layer. Furthermore, the inventors have discovered that a polyester can be used in place of the above-described composition comprising the at least two polyamides.

Furthermore, the inventors have discovered that surprisingly, such films can be processed, i.e., oriented, at substantially higher speeds than film not containing the polyamide composition, i.e., films containing primarily polyolefins only, or films containing EVOH and polyolefins. Furthermore, the presence of the layer comprising the polyamides has been found to substantially increase the toughness of the casing, by providing a substantial increase in the modulus of the film. Surprisingly, even relatively thin polyamide layers can increase the toughness of the casing, thereby permitting the film to be further downgaged for any desired application, thereby further reducing the cost of the film.

Furthermore, the inventors have extended the above discoveries, i.e., which initially led to the casings of the present invention, to be applied to multilayer films generally, and especially articles made therefrom, such as bags, and other articles suitable for the packaging of various products, especially foods. That is, the incorporation of the above-described polyamide composition has been found to provide enhanced toughness, processability, and abrasion-resistance to oriented multilayer films containing same. More particularly, multilayer films containing a plurality of polyolefin layers, and an $O_2$-barrier layer (containing EVOH or polyvinylidene chloride), benefit from the inclusion of a layer comprising the polyamide-containing composition.

As a first aspect, the present invention is directed to an article of manufacture which comprises a heat-shrinkable, biaxially-oriented, thermoplastic, multilayer film hermetically sealed to itself. The article can be, for example, a bag, a casing, etc., i.e., a film converted into an article suitable for packaging end use. The multilayer film comprises an outside surface having an oil thereon, a first film layer, and a second film layer. The first film layer comprises at least one member selected from the group consisting of (1) a polyester, and (2) a composition comprising a first polyamide and a second polyamide, wherein the first polyamide is a member selected from the group consisting of nylon 6, nylon 66, and nylon 6/66, and wherein the second polyamide has a different crystal structure than the first polyamide. Optionally, the first film layer comprises a blend of the first polyamide and a polyester. The second film layer comprising a polyolefin. The first film layer has a thickness of less than about 20 percent based on a total thickness of the multilayer film; preferably less than about 15 percent based on the total thickness of the multilayer film. Finally, the first film layer is between the oil and the second film layer.

Preferably, the first polyamide is at least one member selected from the group consisting of nylon 6, nylon 9, nylon 11, nylon 12, nylon 66, nylon 610, nylon 612, nylon 6I, nylon 6T, and nylon 6/66. Preferably, the second polyamide comprises at least one member selected from the group consisting of nylon 6, nylon 9, nylon 11, nylon 12, nylon 66, nylon 610, nylon 612, nylon 6I, and nylon 6T, and copolymers thereof such as nylon 6/66, nylon 6/69, nylon 6/12, nylon 66/610 nylon, 6/612 nylon, 6I/6T nylon, and nylon 6/6I; more preferably, nylon 6, nylon 66, nylon 6/66, nylon 6/69, nylon 6/12, nylon 66/610, and nylon 6I/6T; still more preferably nylon 6, nylon 66, nylon 6/12, nylon 66/610, and nylon 6I/6T. Preferably, the first polyamide is nylon 6 in an amount of from about 60 to 95 weight percent, based on the weight of the composition. Preferably, the composition comprises the second polyamide in an amount of from about 40 to 5 weight percent, based on the weight of the composition.

Preferably, the first film layer has a thickness of less than 20 percent, more preferably, less than 15 percent, based on the total thickness of the multilayer film; even more preferably, from about 2 to 15 percent; still more preferably, from about 5 to 12 percent, based on the total thickness of the multilayer film; and yet still more preferably, from about 5 to 7 percent, based on the total thickness of the multilayer film.

Preferably, the composition comprises the first polyamide (which preferably is nylon 6) in an amount of from about 10 to 95 weight percent, based on the weight of the composition; more preferably, from about 60 to 95 weight percent; still more preferably, from about 85 to 95 weight percent. Preferably, the composition comprises the second polyamide in an amount of from about 90 to 5 weight percent, based on the weight of the composition; more preferably, in an amount of from about 40 to 5 weight percent; still more preferably, in an amount of from about 15 to 5 weight percent.

Optionally, the multilayer film can be crosslinked, either in part or in its entirety. Partial crosslinking of the film is generally accomplished by extruding a base film which is crosslinked by irradiation, following which the crosslinked base film is extrusion coated. with one or more additional layers, and the resulting laminate is thereafter oriented in at least one direction. Preferably, the multilayer film has a thickness of from about 0.3 to 6 mils; more preferably, from about 0.5 to 3.5 mils; still more preferably, from about 1.5 to 2.5 mils. Preferably, the multilayer film has a total free shrink at 185° F. of from about 5 to 140 percent; more preferably, from about 10 to 80 percent; still more preferably, from about 20 to 60 percent.

For casing articles, preferably the casing film is predominately olefinic film with improved oil resistance. Preferably, the casing film has at least one interior layer which is predominately nylon 6. Preferably, the casing film is a multilayer, shirrable, cook-in film which has at least a first outer layer, second outer layer, and at least one intermediate layer which is a blend of nylon 6 and a second polyamide. Preferably, the casing film is a biaxially oriented, heat shrinkable film comprising nylon 6 blended with at least about 5% by weight of the second polyamide.

Optionally, the article comprises a multilayer film further comprising a third film layer comprising at least one member selected form the group consisting of ethylene/vinyl alcohol copolymer, polyvinylidene chloride, and polyalkylene carbonate. This layer serves as an $O_2$-barrier layer, and preferably has a thickness of less than about 15 percent, based on a total thickness of the multilayer film. Preferably, the first film layer is directly adhered to the third film layer.

Optionally, the first film layer comprises a first polyolefin, and the multilayer film further comprises a fourth film layer comprising a second polyolefin. Preferably, the third film layer is between the second film layer and the fourth film layer, and the fourth film layer is an inside layer, i.e., with respect to the article.

Preferably, the second polyolefin comprises at least one member selected from the group consisting of polyethylene homopolymer, polypropylene homopolymer, polybutylene homopolymer, ethylene/alpha-olefin copolymer, propylene/alpha-olefin copolymer, butene/alpha-olefin copolymer, ethylene/unsaturated ester copolymer, ethylene/unsaturated acid copolymer. Preferably, the second polyolefin is ionomerized.

Preferably, the first polyolefin comprises at least one member selected from the group consisting of polyethylene homopolymer, polypropylene homopolymer, polybutylene homopolymer, ethylene/alpha-olefin copolymer, propylene/alpha-olefin copolymer, butene/alpha-olefm copolymer, ethylene/unsaturated ester copolymer, ethylene/unsaturated acid copolymer. More preferably, the first polyolefin comprises at least one member selected from the group consisting of ethylene/alpha-olefin copolymer, ethylene/unsaturated ester copolymer, ethylene/unsaturated acid copolymer.

Optionally, the multilayer film further comprises a fifth layer comprising a third polyolefin comprising at least one member selected from the group consisting of ethylene/alpha-olefin copolymer, ethylene/unsaturated ester copolymer, and ethylene/unsaturated acid copolymer. Preferably, the third layer is between the fourth layer and the fifth layer.

Optionally, the multilayer film further comprises a sixth layer and a seventh layer, wherein the sixth layer is between the second layer and the third layer and the seventh layer is between the third layer and the fifth layer. Preferably, the sixth layer comprises at least one member selected from the group consisting of anhydride grafted polyolefin and acid modified polyolefin; preferably, the seventh layer comprises at least one member selected from the group consisting of anhydride grafted polyolefin and acid modified polyolefin.

As a second aspect, the present invention pertains to a packaged product comprising a package having a product therein. The package comprises the heat-shrinkable, biaxially-oriented, thermoplastic, multilayer film hermetically sealed to itself. The multilayer film is as described above for the article of the present invention. The product comprises cooked meat. Preferred multilayer films for use in the packaged product are the same preferred films for use in the article of the present invention described immediately above.

Preferably, the inside surface of the fourth layer of the multilayer film adheres to the cooked meat product. Preferably, the meat product comprises at least one member selected from the group consisting of ham, turkey, bologna, liver sausage, roast beef, lamb, and fish.

After discovering the article and packaged product of the present invention, the various advantages obtained through the use of the layer comprising the polyamide blend was extended to additional multilayer film structures and articles made therefrom, especially bags and other packaged products. That is, the polyamide blend is used to provide various multilayer films having: enhanced toughness, enabling downgauged films which provide comparable performance; improved interply adhesion, due to stronger adhesion of the tie layers to nylon than to EVOH; and improved processability, i.e., enhanced orientation speeds. These advantages are obtained regardless of the presence of oil on the outside of the film, and surprisingly, even relatively thin layers of the polyamide blend, i.e., layers comprising less than about 20 percent, and even less than 15 percent, based on the total thickness of the multilayer film, provide these further advantages.

Thus, as a third aspect, the present invention is directed to a heat-shrinkable, biaxially-oriented, thermoplastic multilayer film comprising a first film layer, a second film layer, a third film layer, and a fourth film layer, The first film layer comprises at least one member selected from the group consisting of: (i) a polyester, and (ii) a composition comprising a first polyamide and a second polyamide, wherein the first polyamide is a member selected from the group consisting of nylon 6, nylon 66, and nylon 6/66, and wherein the second polyamide has a different crystal structure than the first polyamide. The second film layer comprises a first polyolefin. The third film layer comprises at least one member selected form the group consisting of EVOH, PVDC, and polyalkylene carbonate, the third film layer being an $O_2$-barrier layer having a thickness of less than about 15 percent, based on a total thickness of the multilayer film. The fourth film layer comprises a second polyolefin. The second film layer is between the third film layer and the fourth film layer. The first film layer has a thickness of less than about 20 percent, more preferably less than 15%, based on a total thickness of the multilayer film. Preferred multilayer films according to the present invention are as further described immediately above in the summary of the article of the present invention.

As a fourth aspect, the present invention is directed to a bag comprising a heat-shrinkable, biaxially-oriented, thermoplastic multilayer film comprising the multilayer film set forth immediately above in the summary of the third aspect of the present invention. The bag can be an end seal bag or a side seal bag. Preferably, the first layer is directly adhered to the third layer. Preferably, the fourth layer is an inside layer. Preferred bags, according to the present invention are as further described immediately above in the summary of the preferred multilayer films of the present invention.

As a fifth aspect, the present invention is directed to an alternative bag comprising a heat-shrinkable, biaxially-oriented, thermoplastic multilayer film comprising a first film layer, a second film layer, a third film layer, and a fourth film layer. The first film layer comprises a composition comprising a first polyamide and at least one member selected from the group consisting of a first polyolefin, a second polyamide, and a polyester, wherein the first polyamide is a member selected from the group consisting of nylon 6, nylon 66, and nylon 6/66, and wherein the first polyolefin, the second polyamide, and the polyester each has a different crystal structure than the first polyamide. The second film layer comprises a second polyolefin. The third layer comprises a third polyolefin, which in turn comprises at least one member selected from the group consisting of ethylene/alpha-olefin copolymer, ethylene/unsaturated acid copolymer, and ethylene/unsaturated ester copolymer. The fourth layer comprises a fourth polyolefin. Optionally, the film comprises a fifth layer comprising at least one member selected from the group consisting of anhydride-modified polyolefin and acid-modified polyolefin; and further optionally, a sixth layer comprising at least one member selected from the group consisting of anhydride-modified polyolefin and acid-modified polyolefin. The first film layer has a thickness of less than about 20 percent, based on a total thickness of the multilayer film. The second film layer is between the third film layer and the fourth film layer.

DETAILED DESCRIPTION OF THE INVENTION

As used herein, the term "sealed" refers to any and all means of closing a package, such as heat sealing via hot air and/or heated bar, ultrasonic sealing, and even the use of clips on, for example, a casing clipped at both ends.

As used herein, the phrase "meat-contact layer", refers to a layer of a multilayer film which is in direct contact with the meat-containing product packaged in the film. The meat-contact layer is an outer layer, in order to be in direct contact with the meat product. The meat-contact layer is an inside layer in the sense that in the packaged meat product, the meat-contact layer is the innermost film layer in direct contact with the meat.

As used herein, the phrase "meat-contact surface" refers to a surface of a meat-contact layer which is in direct contact with the meat in the package.

As used herein, the phrase "cook-in" refers to the process of cooking a product packaged in a material capable of withstanding exposure to long and slow cooking conditions while containing the food product, for example cooking at 57° C. to 121° C. (i.e, 135° F.–250° F.) for 2–12 hours, preferably 57° C. to 95° C. (i.e, 135° F.–203° F.) for 2–12 hours. Cook-in packaged foods are essentially pre-packaged, pre-cooked foods which may be directly transferred to the consumer in this form. These types of foods may be consumed with or without warming. Cook-in packaging materials maintain seal integrity, and in the case of multilayer films are delamination resistant. Cook-in films must also be heat shrinkable under cook-in conditions so as to form a tightly fitting package. Cook-in films preferably have a tendency for adhesion to the food product, thereby preventing "cook-out", which is the collection of juices between the outer surface of the food product and the meat-contact surface of the film, i.e., the surface in direct contact with the meat, thereby increasing product yield. Additional optional characteristics of films for use in cook-in applications include delamination-resistance, low oxygen permeability, heat-shrinkability representing about 20–50% biaxial shrinkage at about 85° C. (185° F.), and optical clarity. Films suitable for cook-in end use are typically also suitable for pasteurization end use.

Additionally, the food contact layer may serve as a heat seal layer. However, any heat seal must be able to withstand standard cook conditions. Because of the difficulty of providing such a seal as well as, optionally, adhesion to the food product, and because of the preferred sausage-like shape which is desirable in the final food product, casings are often clipped rather than heat sealed.

As used herein, the term "adhere" is intended to mean that the food contact surface of the film bonds during cook-in to the contained food product to an extent sufficient to substantially prevent accumulation of fluids between the film and the contained product. In general, there is an absence of a substantial amount of free moisture if the level of free moisture is from about 0 to 2%, based on the weight of the meat product before cooking. Preferably the amount of free moisture is from about 0 to 1%, more preferably, 0 to 0.5%, and still preferably from 0 to 0.1 percent based on the weight of the meat product before cooking.

As used herein, "EVOH" refers to ethylene vinyl alcohol copolymer. EVOH includes saponified or hydrolyzed ethylene vinyl acetate copolymers, and refers to a vinyl alcohol copolymer having an ethylene comonomer, and prepared by, for example, hydrolysis of vinyl acetate copolymers, or by chemical reactions with polyvinyl alcohol. The degree of hydrolysis is preferably at least 50% and more preferably at least 85%.

As used herein, the term "barrier", and the phrase "barrier layer", as applied to films and/or film layers, is used with reference to the ability of a film or film layer to serve as a barrier to atmospheric oxygen, i.e. $O_2$. However, the present invention is particularly directed to casings comprising a heat shrinkable, shirrable film suitable for cook-in end use, which does not comprise any of the relatively expensive polymers which act as an $O_2$-barrier. Relatively expensive polymers which serve as $O_2$-barrier compositions include ethylene/vinyl alcohol.

However, it should be noted that in addition to those resins traditionally considered as gas barriers, that is, ethylene vinyl alcohol, acrylonitriles, and vinylidene chloride copolymers such as vinylidene chloride/vinyl chloride, and vinylidene chloride/methyl acrylate, nylons are often considered to be gas barrier resins. The specific definition of a gas barrier will vary depending on the end-use application of the film in question. It is well known that the permeability of any polyamide film will decrease with increasing thickness. Thus, oriented nylon films in accordance with the present invention may be employed in gas barrier applications.

As used herein, the term "oriented" refers to a polymer-containing material which has been stretched at an elevated temperature (the orientation temperature), followed by being "set" in the stretched configuration by cooling the material while substantially retaining the stretched dimensions. Upon subsequently heating unrestrained, unannealed, oriented polymer-containing material to its orientation temperature, heat shrinkage is produced almost to the original unstretched, i.e., pre-oriented dimensions. More particularly, the term "oriented", as used herein, refers to oriented films, wherein the orientation can be produced in one or more of a variety of manners.

As used herein, the phrase "orientation ratio" refers to the multiplication product of the extent to which the plastic film material is expanded in several directions, usually two directions perpendicular to one another. Expansion in the machine direction is herein referred to as "drawing", whereas expansion in the transverse direction is herein referred to as "stretching". The degree of orientation is also referred to as the orientation ratio, or sometimes as the "racking ratio".

As used herein, the term "monomer" refers to a relatively simple compound, usually containing carbon and of low molecular weight, which can react to form a polymer by combining with itself or with other similar molecules or compounds.

As used herein, the term "comonomer" refers to a monomer which is copolymerized with at least one different monomer in a copolymerization reaction, the result of which is a copolymer.

As used herein, the term "polymer" refers to the product of a polymerization reaction, and is inclusive of homopolymers, copolymers, terpolymers, etc. In general, the layers of a film can consist essentially of a single polymer, or can have still additional polymers blended therewith.

As used herein, the term "homopolymer" is used with reference to a polymer resulting from the polymeization of a single monomer, i.e., a polymer consisting essentially of a single type of repeating unit.

As used herein, the term "copolymer" refers to polymers formed by the polymerization reaction of at least two different monomers. For example, the term "copolymer" includes the copolymerization reaction product of ethylene and an alpha-olefin, such as 1-hexene. However, the term "copolymer" is also inclusive of, for example, the copolymerization of a mixture of ethylene, propylene, 1-hexene, and 1-octene.

As used herein, the phrase "modified polymer", as well as more specific phrases such as "modified ethylene vinyl acetate copolymer", and "modified polyolefin" refer to such polymers having an anhydride functionality, as defined immediately above, grafted thereon and/or copolymerized therewith and/or blended therewith. Preferably, such modified polymers have the anhydride functionality grafted on or polymerized therewith, as opposed to merely blended therewith.

As used herein, the term "polymerization" is inclusive of homopolymerizations, copolymerizations, terpolymerizations, etc., and includes all types of copolymerizations such as random, graft, block, etc. In general, the polymers, in the films used in accordance with the present invention, can be prepared in accordance with any suitable polymerization process, including slurry polymerization, gas phase polymerization, and high pressure polymerization processes.

As used herein, the term "copolymerization" refers to the simultaneous polymerization of two or more monomers.

As used herein, a copolymer identified in terms of a plurality of monomers, e.g., "propylene/ethylene copolymer", refers to a copolymer in which either monomer copolymerizes in a higher weight or molar percent. However, the first listed monomer preferably is polymerized in a higher weight percent than the second listed monomer, and, for copolymers which are terpolymers, quadripolymers, etc., preferably, the first monomer copolymerizes in a higher weight percent than the second monomer, and the second monomer copolymerizes in a higher weight percent than the third monomer, etc.

As used herein, terminology employing a "/" with respect to the chemical identity of a copolymer (e.g., "an ethylene/alpha-olefin copolymer"), identifies the comonomers which are copolymerized to produce the copolymer. Such phrases as "ethylene alpha-olefin copolymer" are the respective equivalent of "ethylene/alpha-olefm copolymer."

As used herein, the phrase "heterogeneous polymer" refers to polymerization reaction products of relatively wide variation in molecular weight and relatively wide variation in composition distribution, i.e., polymers made, for example, using conventional Ziegler-Natta catalysts. Heterogeneous polymers are useful in various layers of the film used in the present invention. Such polymers typically contain a relatively wide variety of chain lengths and comonomer percentages.

As used herein, the phrase "heterogeneous catalyst" refers to an insoluble catalyst suitable for use in the polymerization of heterogeneous polymers, as defined above. Heterogeneous catalysts are comprised of several kinds of active sites which differ in Lewis acidity and steric environment. Ziegler-Natta catalysts are heterogeneous catalysts. Examples of Ziegler-Natta heterogeneous systems include metal halides activated by an organometallic co-catalyst, such as titanium chloride, optionally containing magnesium chloride, complexed to trialkyl aluminum and may be found in patents such as U.S. Pat. No. 4,302,565, to GOEKE, et. al., and U.S. Pat. No. 4,302,566, to KAROL, et. al., both of which are hereby incorporated, in their entireties, by reference thereto.

As used herein, the phrase "homogeneous polymer" refers to polymerization reaction products of relatively narrow molecular weight distribution and relatively narrow composition distribution. Homogeneous polymers are useful in various layers of the multilayer film used in the present invention. Homogeneous polymers exhibit a relatively even sequencing of comonomers within a chain, the mirroring of sequence distribution in all chains, and the similarity of length of all chains, and are typically prepared using metallocene, or other single-site type catalysis.

More particularly, homogeneous ethylene/alpha-olefin copolymers may be characterized by one or more methods known to those of skill in the art, such as molecular weight distribution ($M_w/M_n$), composition distribution breadth index (CDBI), and narrow melting point range and single melt point behavior. The molecular weight distribution ($M_w/M_n$), also known as polydispersity, may be determined by gel permeation chromatography. The homogeneous ethylene/alpha-olefin copolymers useful in this invention will have a ($M_w/M_n$) of less than 2.7. Preferably, the ($M_w/M_n$) will have a range of about 1.9 to 2.5. More preferably, the ($M_w/M_n$) will have a range of about 1.9 to 2.3. The composition distribution breadth index (CDBI) of such homogeneous ethylene/alpha-olefin copolymers will generally be greater than about 70 percent. The CDBI is defined as the weight percent of the copolymer molecules having a comonomer content within 50 percent (i.e., plus or minus 50%) of the median total molar comonomer content. The CDBI of linear polyethylene, which does not contain a comonomer, is defined to be 100%. The Composition Distribution Breadth Index (CDBI) is determined via the technique of Temperature Rising Elution Fractionation (TREF). CDBI determination clearly distinguishes the homogeneous copolymers used in the present invention (narrow composition distribution as assessed by CDBI values generally above 70%) from VLDPEs available commercially which generally have a broad composition distribution as assessed by CDBI values generally less than 55%. The CDBI of a copolymer is readily calculated from data obtained from techniques known in the art, such as, for example, temperature rising elution fractionation as described, for example, in Wild et. al., *J. Poly. Sci. Poly. Phys. Ed.*, Vol. 20, p.441 (1982). Preferably, the homogeneous ethylene/alpha-olefin copolymers have a CDBI greater than about 70%, i.e., a CDBI of from about 70% to 99%. In general, the homogeneous ethylene/alpha-olefin copolymers in the multilayer films of the present invention also exhibit a relatively narrow melting point range, in comparison with "heterogeneous copolymers", i.e., polymers having a CDBI of less than 55%. Preferably, the homogeneous ethylene/alpha-olefin copolymers exhibit an essentially singular melting point characteristic, with a peak melting point ($T_m$), as determined by Differential Scanning Colorimetry (DSC), of from about 60° C. to 110° C. Preferably the homogeneous copolymer has a DSC peak $T_m$ of from about 80° C. to 100° C. As used herein, the phrase "essentially single melting point" means that at least about 80%, by weight, of the material corresponds to a single $T_m$ peak at a temperature within the range of from about 60° C. to 110° C., and essentially no substantial fraction of the material has a peak melting point in excess of about 115° C., as determined by DSC analysis. DSC measurements are made on a Perkin Elmer System 7 Thermal Analysis System. Melting information reported are second melting data, i.e., the sample is heated at a programmed rate of 10° C./min. to a temperature below its critical range. The sample is then reheated (2nd melting) at a programmed rate of 10° C./min. The presence of higher melting peaks is detrimental to film properties such as haze, and compromises the chances for meaningful reduction in the seal initiation temperature of the final film.

A homogeneous ethylene/alpha-olefin copolymer can, in general, be prepared by the copolymerization of ethylene and any one or more alpha-olefin. Preferably, the alpha-olefin is a $C_3$–$C_{20}$ a-monoolefin, more preferably, a $C_4$–$C_{12}$ a-monoolefin, still more preferably, a $C_4$–$C_8$ a-monoolefin. Still more preferably, the alpha-olefin comprises at least one member selected from the group consisting of butene-1, hexene-1, and octene-1, i.e., 1-butene, 1-hexene, and 1-octene, respectively. Most preferably, the alpha-olefin comprises octene-1, and/or a blend of hexene-1 and butene-1.

Processes for preparing homogeneous polymers are disclosed in U.S. Pat. No. 5,206,075, U.S. Pat. No. 5,241,031, and PCT International Application WO 93/03093, each of which is hereby incorporated by reference thereto, in its entirety. Further details, regarding the production and use of one genus of homogeneous ethylene/alpha-olefin copolymers are disclosed in U.S. Pat. No. 5,206,075, to HODGSON, Jr.; U.S. Pat. No. 5,241,031, to MEHTA; PCT International Publication Number WO 93/03093, in the name of Exxon Chemical Company; PCT International Publication Number WO 90/03414, in the name of Exxon Chemical Patents, Inc., all four of which are hereby incorporated in their entireties, by reference there. Still another genus of homogeneous ethylene/alpha-olefin copolymers is disclosed in U.S. Pat. No. 5,272,236, to LAI, et. al., and U.S. Pat. No. 5,278,272, to LAI, et. al., both of which are hereby incorporated in their entireties, by reference thereto.

As used herein, the phrase "homogeneous catalyst" refers to a soluble catalyst suitable for use in the polymerization of homogeneous polymers, as defined above. Homogeneous catalysts are also referred to as "single site catalysts", due to the fact that such catalysts typically have only one type of catalytic site, which is believed to be the basis for the homogeneity of the polymers they catalyze the polymerization of.

As used herein, the term "polyolefin" refers to any polymerized olefin, which can be linear, branched, cyclic, aliphatic, aromatic, substituted, or unsubstituted. More specifically, included in the term polyolefin are homopolymers of olefins, copolymers of olefins, copolymers of an olefin and an non-olefinic comonomer copolymerizable with the olefin, such as vinyl monomers, modified polymers thereof, and the like. Specific examples include polypropylene homopolymer, polybutylene homopolymers, polyethylene homopolymers, poly-butene, propylene/alpha-olefin copolymer, butene/alpha-olefin copolymers, ethylene/alpha-olefin copolymers, butene/alpha-olefin copolymers, ethylene/vinyl acetate copolymers, ethylene/ethyl acrylate copolymers, ethylene/butyl acrylate copolymers, ethylene/methyl acrylate copolymers, ethylene/acrylic acid copolymers, ethylene/methacrylic acid copolymers, modified polyolefin resins, ionomer resins, polymethylpentene, etc. The modified polyolefin resins include modified polymers prepared by copolymerizing the homopolymer of the olefn or copolymer thereof with an unsaturated carboxylic acid, e.g., maleic acid, fumaric acid or the like, or a derivative thereof such as the anhydride, ester or metal salt or the like. It could also be obtained by incorporating into the olefin homopolymer or copolymer, an unsaturated carboxylic acid, e.g., maleic acid, fumaric acid or the like, or a derivative thereof such as the anhydride, ester or metal salt or the like.

As used herein, terms identifying polymers, such as "polyamide", "polyester", etc. are inclusive of not only polymers comprising repeating units derived from monomers known to polymerize to form a polymer of the named type, but are also inclusive of comonomers, derivatives, etc. which can copolymerize with monomers known to polymerize to produce the named polymer. For example, the term "polyamide" encompasses both polymers comprising repeating units derived from monomers, such as caprolactam, which polymerize to form a polyamide, as well as copolymers derived from the copolymerization of caprolactam with a comonomer which when polymerized alone does not result in the formation of a polyamide. Furthermore, terms identifying polymers are also inclusive of "blends" of such polymers with other polymers of a different type.

As used herein, the phrase "ethylene alpha-olefin copolymer", and "ethylene/alpha-olefin copolymer", refer to such heterogeneous materials as linear low density polyethylene (LLDPE), and very low and ultra low density polyethylene (VLDPE and ULDPE); and homogeneous polymers such as metallocene catalyzed polymers such as EXACT (™) materials supplied by Exxon, and TAFMER (™) materials supplied by Mitsui Petrochemical Corporation. These materials generally include copolymers of ethylene with one or more comonomers selected from $C_4$ to $C_{10}$ alpha-olefins such as butene-1 (i.e., 1-butene), hexene-1, octene-1, etc. in which the molecules of the copolymers comprise long chains with relatively few side chain branches or cross-linked structures. This molecular structure is to be contrasted with conventional low or medium density polyethylenes which are more highly branched than their respective counterparts. LLDPE, as used herein, has a density usually in the range of from about 0.91 grams per cubic centimeter to about 0.94 grams per cubic centimeter. Other ethylene/alpha-olefin copolymers, such as the long chain branched homogeneous ethylene/alpha-olefin copolymers available from the Dow Chemical Company, known as AFFINITY (™) resins, are also included as another type of ethylene alpha-olefm copolymer useful in the present invention.

In general, the ethylene/alpha-olefin copolymer comprises a copolymer resulting from the copolymerization of from about 80 to 99 weight percent ethylene and from 1 to 20 weight percent alpha-olefin. Preferably, the ethylene alpha-olefin copolymer comprises a copolymer resulting from the copolymerization of from about 85 to 95 weight percent ethylene and from 5 to 15 weight percent alpha-olefin.

As used herein, the phrases "inner layer" and "internal layer" refer to any layer, of a multilayer film, having both of its principal surfaces directly adhered to another layer of the film.

As used herein, the phrase "outer layer" refers to any film layer of a multilayer film having only one of its principal surfaces directly adhered to another layer of the film.

As used herein, the phrase "inside layer" refers to the outer layer, of a multilayer film packaging a product, which is closest to the product, relative to the other layers of the multilayer film.

As used herein, the phrase "outside layer" refers to the outer layer, of a multilayer film packaging a product, which is furthest from the product relative to the other layers of the multilayer film.

As used herein, the phrase "directly adhered", as applied to film layers, is defined as adhesion of the subject film layer to the object film layer, without a tie layer, adhesive, or other layer therebetween. In contrast, as used herein, the word "between", as applied to a film layer expressed as being between two other specified layers, includes both direct adherence of the subject layer to the two other layers it is between, as well as including a lack of direct adherence to either or both of the two other layers the subject layer is between, i.e., one or more additional layers can be imposed between the subject layer and one or more of the layers the subject layer is between.

As used herein, the term "core", and the phrase "core layer", as applied to multilayer films, refer to any internal film layer which has a primary function other than serving as an adhesive or compatibilizer for adhering two layers to one another. Usually, the core layer or layers provide the multilayer film with a desired level of strength, i.e., modulus, and/or optics, and/or added abuse resistance, and/or specific impermeability.

As used herein, the phrase "sealant layer", with respect to multilayer films, refers to an outer film layer, or layers, involved in the sealing of the film to itself or another layer. It should also be recognized that in general, the outer 0.5 to 3 mils of a film can be involved in the sealing of the film to itself or another layer. With respect to packages having only fin-type seals, as opposed to lap seals, the phrase "sealant layer" generally refers to the inside film layer of a package, as well as supporting layers adjacent this sealant layer often being sealed to itself, and frequently serving as a food contact layer in the packaging of foods.

As used herein, the phrase "tie layer" refers to any internal layer having the primary purpose of adhering two layers to one another.

As used herein, the phrase "skin layer" refers to an outside layer of a multilayer film in packaging a product, this skin layer being subject to abuse.

As used herein, the phrase "bulk layer" refers to any layer of a film which is present for the purpose of increasing the abuse-resistance, toughness, modulus, etc., of a multilayer film. Bulk layers generally comprise polymers which are inexpensive relative to other polymers in the film which provide some specific purpose unrelated to abuse-resistance, modulus, etc.

The names "first layer", "second layer", as used herein, are generally indicative of the manner in which a multilayer film structure is built up. That is, in general, the first layer can be present without any of the additional layers described, or the first and second layers can be present without any of the additional layers described, etc.

As used herein, the term "extrusion" is used with reference to the process of forming continuous shapes by forcing a molten plastic material through a die, followed by cooling or chemical hardening. Immediately prior to extrusion through the die, the relatively high-viscosity polymeric material is fed into a rotating screw of variable pitch, which forces it through the die.

As used herein, the term "coextrusion" refers to the process of extruding two or more materials through a single die with two or more orifices arranged so that the extrudates merge and weld together into a laminar structure before chilling, i.e., quenching. Coextrusion can be employed in film blowing, free film extrusion, and extrusion coating processes.

As used herein, the phrase "machine direction", herein abbreviated "MD", refers to a direction "along the length" of the film, i.e., in the direction of the film as the film is formed during extrusion and/or coating.

As used herein, the phrase "transverse direction", herein abbreviated "TD", refers to a direction across the film, perpendicular to the machine or longitudinal direction.

As used herein, the phrase "free shrink" refers to the percent dimensional change in a 10 cm×10 cm specimen of film, when subjected to selected heat, as measured by ASTM D 2732, as known to those of skill in the art.

As used in the art, the term "casing" or "tubular casing" generally means tubing of natural or manufactured materials. Natural casings are generally cellulosic. The term "shirring" refers to the process by which lengths of the tubular material are folded or pleated into a relatively short length, i.e., by undergoing forcible length compression over the stuffing horn. The resulting "shirred casings" are provided as "sticks", i.e., long lengths of casing having a substantially large bore which have been shirred and compressed into short, compact, self-sustaining lengths. The shirred casing may also be sheathed inside a retaining sleeve.

The films described in the various Examples of the invention as set forth hereinbelow are preferably prepared in accordance with a process as schematically illustrated in FIG. 1, in which the various polymeric formulations are supplied to circular die 30 from a plurality of extruders 31, only two of which are illustrated in FIG. 1. The number of extruders 31 is at least as great as the number of different chemical compositions present in the various layers of the multilayer film, but can be fewer than the number of layers of the film in the event that a stream from an extruder is split to form two different film layers. The various layers of the film are joined within circular die 30, resulting in the formation of tube 32, which is a substantially unoriented tape comprising all of the layers ultimately present in the film used in accordance with the present invention. The meat-contact layer, i.e., the first layer, is the inside layer of tube 32, and the abuse layer, i.e., the second layer, is the outside layer of tube 32. The barrier layer, the various core layers, and the various tie layers, are preferably positioned between the first and second layers.

Circular die 30 is heated in conventional fashion by means not shown. As tube 32 emerges from the face of die 30, corn starch (not illustrated) is sprayed inside tube 32, in order to prevent blocking of tube 32, as known to those of skill in the art. As tube 32 leaves the face of die 30, tube 32 is drawn in a downward direction, past water-cooling ring 34, having water 38 flowing downwardly therefrom, over the exterior surface of tube 32, and cascading downward into tank 35. Overflow 36 maintains the level of water 38 in tank 35. Tube 32 is drawn downwardly and between driven pinch rolls 37.

After passing over guide roll 39, tube 32 is passed through a scan beam of an electronic crosslinking unit (not illustrated), as known to those of skill in the art. Tube 32, emerging from the electronic crosslinking unit, is then fed to heating chamber 40. Preferably, heating chamber 40 heats tube 32 using hot water or steam, at a temperature of from about 180 to 280° F., with heating taking place for a period of from about 1 to 100 seconds. At the outlet of heating chamber 40 are pinch rolls 41, which forward the tube 32, now heated, immediately into an orientation zone, in which the emerging heated tube is simultaneously stretched and drawn, resulting in the formation of a bubble of oriented multilayer film 43, as used in the present invention. The hot tube, upon emerging from heating chamber 40, is stretched in the transverse direction via inflation with air 42 (introduced into the tube to form a bubble between pinch rolls 41 and pinch rolls 44), and drawn in the machine direction by pinch rolls 44, which forward the resulting oriented multilayer film 43 at a higher speed than the speed at which tube 32 is forwarded by pinch rolls 41. Multilayer film 43 is cooled by external air while in the bubble configuration. The bubble of oriented multilayer film 43 is gradually flattened with the aid of converging rolls 45. Following the collapse of the bubble of multilayer film 43 by converging rolls 45, the resulting flattened multilayer film is fed to windup roll 46, which is rotated by a motor (not illustrated).

The process for producing the article, film, and bag according to the present invention is carried out by extruding a tape, heating the tape, and orienting the heated tape. The extruded tape comprises a first layer and a second layer. The first layer comprises a first polyamide and at least one member selected from the group consisting of a first polyolefin, a second polyamide, and a polyester. The first polyamide is a member selected from the group consisting of nylon 6, nylon 66, and nylon 6/66. The first polyolefin, second polyamide, and polyester each has a different crystal structure than the first polyamide. The second film layer comprises a polyolefin. The tape is heated to a temperature of from about 180° F. to about 280° F., for a period of at least one second, so that a heated tape is produced. The heated tape is oriented in at least one direction, so that an oriented multilayer film is produced. The first film layer has a thickness of less than about 20 percent, based on a total thickness of the multilayer film, preferably less than 15 percent, etc. Preferably, the tape is heated with water having a temperature of from about 185° F. to 212° F., for a time of from about 3 to 50 seconds. Preferably, the tape is biaxially oriented so that the film has free shrink, at 185° F., of at least 15% in the machine direction and at least 15% in the machine direction.

Once the film is produced, it can be converted into a casing by a backseaming operation, as known to those of skill in the art. Alternatively, it is possible to produce a seamless casing by extruding a tape have a lay-flat width such that upon orientation, the resulting seamless tubular film has a desired casing diameter.

The filling of various types of casings with viscous meat emulsion can be carried out by various automatic and semi-automatic processes. In general, these processes include positioning a shirred continuous film casing length over a stuffing horn and thereafter continuously deshirring the casing and stuffing the deshirred casing with viscous meat emulsion fed under pressure through the stuffing horn and into the casing interior.

Apparatus and processes are well known in the food casing art for producing shirred, tubular casings. Such apparatus may be employed in the preparation of pleated and compressed tubular casings wherein the compression ratios (unshirred to shirred tubing length) are in the order of at least about 40:1 and up to about 100:1 or even greater. Using suitable food stuffing machinery, casing lengths can be stuffed with particulate or comminuted viscous material such as meat emulsions or the like, and thereafter formed into unit size lengths, using metal clips and/or heat seals.

Casing films suitable for cook-in end use need to be substantially conformable to the contained food product. Preferably, this substantial conformability is achieved by the film being heat shrinkable under cook-in conditions so as to form a tightly fitting package. In other words, in an preferred embodiment, the film is heat shrinkable under the time-temperature conditions of cook-in. That is, the film possesses sufficient shrink energy such that submerging the packaged food product in hot water will shrink the packaging film snugly around the contained product. Preferably, the film has a monoaxial or biaxial free shrink of up to about 55 percent. In any event, the film must have a free shrink of at least 5% shrinkage in at least one direction at 90° C.

In one conventional method of manufacturing heat shrinkable film, a tubular orientation process is utilized. The tubing may optionally be irradiated prior to or following orientation. A primary tube of the film is biaxially oriented by stretching with internal pressure in the transverse direction and with the use of pinch rolls at different speeds in the machine direction. Then the stretched bubble is collapsed, and the film is wound up as flattened, seamless, tubular film to use later to make casings, as described above, or bags, e.g. either end-seal bags typically made by transversely heat sealing across the width of flattened tubing followed by severing the tubing so that the transverse seal forms the bag bottom, or side-seal bags in which the transverse heat seals form the bag sides and one edge of the tubing forms the bag bottom.

Such bags are typically used by placing the food product in the bag, evacuating the bag, either heat-sealing the bag mouth or gathering and applying a metal clip around the gathered mouth of the bag to form a seal, and then immersing the bag in hot water at approximately the same temperature at which the film was stretch-oriented, typically about 160° to 205° F. (61° to 96° C.), hot water immersion being one of the quickest and most economical means of transferring sufficient heat to the film to shrink it uniformly. Alternatively, the bag may serve as a liner of a cooking mold.

A particularly preferred film for use as a cook-in casing according to the present invention is a biaxially oriented, heat shrinkable, thermoplastic film containing nylon 6, i.e., polycaprolactam. It is known that orientation of nylon 6 at high temperatures or high rates of speed is not feasible. For example, in a trapped bubble process such as described above, attempts to orient thermoplastic film containing nylon 6 out of boiling water or near boiling water temperature have failed because of bubble breakage, believed to be caused by the crystallization of nylon 6 at those temperatures.

In order to prepare a heat shrinkable cook-in film having a layer of 100 percent nylon-6, one has to take into consideration both the crystallization kinetics of nylon-6, and the orientation temperature. It is believed that if, during the orientation process, the film is exposed to elevated temperatures for an extended period of time, e.g., more than a few seconds, the nylon-6 tends to crystallize to an undesirably high degree, i.e. a degree unsuited to subsequent orientation. This crystallization of the nylon-6 causes the bubble to break because the crystals resist orientation, i.e,. making orientation impossible.

By using orientation processes wherein the tape is exposed to elevated temperature only over a very short period of time, the tape can be oriented in a conventional trapped bubble process, because the nylon-6 does not have enough time at the elevated temperature to crystallize to a large extent. However, if it is desired to heat the tape with hot water and/or steam prior to orientation, the conventional trapped bubble process cannot be easily used, i.e., without an unacceptable rate of bubble breaks, due to the large extent of crystallization of the nylon-6 during the heating step. This is especially true if hot water is used as the heat-transfer medium, because the rate of heat transfer by hot water is generally higher than the rate of heat transfer by other sources.

However, the instant inventors have discovered a process by which thermoplastic multilayer films having a layer containing predominantly nylon 6 may be readily oriented by hot water or steam, in a conventional trapped bubble process. This is accomplished by the addition at least 5% by weight of a secondary polyamide having a crystal structure different from the crystal structure of nylon 6. Particularly preferred secondary polyamides include nylon 6/12, nylon 6/69, and nylon 66/610.

Further, the present method for orienting nylon 6-containing films is applicable to films which also include a barrier such as EVOH as is shown in Examples 7–11, below.

Thus, it has been found in accordance with the present invention that the processability of films containing one or more layers of nylon 6 may be greatly improved by the addition of at least 5% by weight of a copolyamide to the nylon 6. However, the nylon 6/copolyamide blend may contain from about 10% to about 95% by weight of nylon 6 and from about 90% to about 5% by weight of copolyamide. Preferably, the nylon 6/copolyamide blend contains from about 60% to about 95% by weight of nylon 6 and from about 40% to about 5% by weight of copolyamide. Optimally, the blend is from about 85% to about 95% by weight of nylon 6 and from about 15% to about 5% by weight of copolyamide.

The following examples are illustrative of the invention.

EXAMPLE 1

A six-layer film was produced according to a method as set forth in the process schematic illustrated in FIG. 1. A 3½ inch wide (lay flat dimension) tube, called a "tape", was produced by the coextrusion process described above wherein the tape cross-section was as follows:

TABLE I

| layer order | layer function | chemical identity | thickness (mils) |
|---|---|---|---|
| 1 | meat-contact | 80% EAO-1 20% IONOMER | 3.5 |
| 2 | core | blend of 80% EVA-1 & 20% EAO-1 | 5.0 |
| 3 | tie | R-AD | 1.1 |
| 4 | oil barrier | blend of 90% PA and 10% CPA-1 | 2.0 |
| 5 | tie | R-AD | 1.1 |
| 6 | outer layer (abuse) | blend of 80% EVA-1 and 20% EAO-1 | 5.0 |

In Table I, layer 1 was the inside layer of the tape, and layer 6 was the outside layer of the tape. Layer 2 was in direct contact with layers 1 and 3, layer 3 in direct contact with layers 2 and 4, and so on. The various resins in the layers were as follows: EAO-1 was DOWLEX (™) 2045.03 linear low density polyethylene, obtained from Dow Plastics, of Freeport, Texas; R-AD was TYMOR (™) 1203 linear low density polyethylene having an anhydride functionality grafted thereon, obtained from Morton International, of Chicago, Ill.; EVA-1 was ELVAX (™) 3128 ethylene vinyl acetate copolymer, obtained from E.I. DuPont de Nemours, of Wilmington, Del.; IONOMER was SURLYN 1650 ionomer, also obtained from DuPont; PA was CAPRON (™) 8209FN, obtained from Allied Signal Corporation, of Wilmington, Del.; CPA-1 was Grilon (™) XE3303, obtained from EMS-American-Grilon, Inc., of Sumter, S.C.

All the resins were extruded between 380° F. and 530° F., and the die was at approximately 400° F. The extruded tape was cooled with water and flattened, the flattened width being 3½ inches wide, in a lay-flat configuration. The tape was then passed through a scanned beam of an electronic cross-linking unit, where it received a total dosage of 57 kilo Grays (kGy), which is the equivalent of 4 mega Rads (MR). After irradiation, the flattened tape was passed through hot water at 204° F. to 210° F., inflated into a bubble, and oriented into tubing having a layflat width of 10 inches and a total thickness of 2.3 mils. The resulting film had about 20% free shrinkage in the longitudinal direction, and about 30% free shrinkage in the transverse direction, when immersed in hot water at 185° F. (using ASTM method D2732-83).

The multilayer films of Examples 2 through 6 were prepared as described above in Example 1. The films of Examples 2–6 differ from Example 1 with respect to the thickness of the layers relative to one another, as well as the total film thickness. Table II provides the composition of the various film layers for Example 1–6. The films in examples 1–2 and 5 were 2.3 mils, while the films of Examples 3, 4, and 6 were 3.0 mils each.

In the foregoing Examples the following materials were employed:

| | |
|---|---|
| IONOMER | SURLYN 1650 (™) zinc salt of ethylene methacrylic acid, obtained from E.I. DuPont de Nemours, of Wilmington, Delaware |
| AAC | NUCREL 1202 HC (™) acrylic acid copolymer, obtained from E.I. DuPont de Nemours & Co., of Wilmington, Delaware |
| EVA-1 | ELVAX 3128 (™) ethylene vinyl acetate having 8.9% by weight of vinyl acetate, obtained from E.I. DuPont de Nemours, of Wilmington, Delaware |
| EVA #2 | LD-318.92 (™) ethylene/vinyl acetate copolymer, obtained from the Exxon Chemical Corporation, of Houston, Texas. |
| EVA #3 | NA295-000 (™) ethylene/vinyl acetate copolymer, obtained from the Quantum Chemical Company, of Cincinnati, Ohio. |
| EVA-AM | BYNEL E361 (™) anhydride-modified ethylene/vinyl acetate copolymer, obtained from E.I. DuPont de Nemours & Co., of Wilmington, Delaware |
| PA (Polyamide #1) | 8209F (™) nylon-6 homopolymer, obtained from Allied Signal Corp., of Morristown, N.J.; Examples 1–4 employ 8209FN, the nucleated version of this Nylon-6 |
| CPA-1 | XE 3303 (™) nylon 66/610 copolymer, obtained from EMS-American Grilon, of Sumter, |
| PA #2 (Polyamide #2) | ULTRAMID B4 (™) nylon 6 homopolymer, obtained from the BASF Chemical Corp., of Parsippany, N.J. |

TABLE II

| | LAYERS 1 SEALANT | 2 CORE | 3 TIE | 4 BARRIER | 5 TIE | 6 ABUSE |
|---|---|---|---|---|---|---|
| Ex. 1 | EAO-1 (80%) IONOMER (20%) | EVA-1 (80%) EAO-1 (20%) | R-AD | PA (90%) CPA-1 (10%) | R-AD | EVA-1 (80%) EAO-1 (20%) |
| % thickness | 19.77 | 28.25 | 6.21 | 11.30 | 6.21 | 28.25 |
| Ex. 2 | EAO-1 (80%) IONOMER (20%) | EVA-1 (80%) EAO-1 (20%) | R-AD | PA (90%) CPA-1 (10%) | R-AD | EVA-1 (80%) EAO-1 (20%) |
| % thickness | 20.71 | 29.59 | 6.51 | 7.10 | 6.51 | 29.59 |
| Ex. 3 | EAO-1 (80%) IONOMER (20%) | EVA-1 (80%) EAO-1 (20%) | R-AD | PA (90%) CPA-1 (10%) | R-AD | EVA-1 (80%) EAO-1 (20%) |
| % thickness | 16.75 | 33.49 | 5.26 | 5.74 | 5.26 | 33.49 |
| Ex. 4 | EAO-1 (80%) IONOMER (20%) | EVA-1 (80%) EAO-1 (20%) | R-AD | PA (90%) CPA-1 (10%) | R-AD | EVA-1 (80%) EAO-1 (20%) |
| % thickness | 16.13 | 32.26 | 5.07 | 9.22 | 5.07 | 32.26 |
| Ex. 5 | EAO-1 (80%) IONOMER (20%) | EVA-1 (80%) EAO-1 (20%) | R-AD | PA (90%) CPA-1 (10%) | R-AD | EVA-1 (80%) EAO-1 (20%) |
| % thickness | 18.41 | 30.67 | 6.45 | 6.45 | 6.45 | 30.67 |
| Ex. 6 | EAO-1 (80%) IONOMER (20%) | EVA-1 (80%) EAO-1 (20%) | R-AD | PA (90%) CPA-1 (10%) | R-AD | EVA-1 (80%) EAO-1 (20%) |
| % thickness | 14.78 | 34.48 | 5.42 | 5.42 | 5.42 | 34.48 |
| Ex. 7 | PEC (75%) EAO-2 (25%) | R-AD | PA (60%) CPA-1 (40%) | EVOH (85%) EAMA (15%) | R-AD | PEC (75%) EAO-2 (25%) |
| % thickness | 25.81 | 16.13 | 6.45 | 9.68 | 16.13 | 25.81 |
| Ex. 8 | PEC (75%) EAO-2 (25%) | R-AD | PA (60%) CPA-1 (40%) | EVOH (85%) EAMA (15%) | R-AD | PEC (75%) EAO-2 (25%) |
| % thickness | 24.24 | 15.15 | 12.12 | 9.09 | 15.15 | 24.24 |
| Ex. 9 | PEC (75%) EAO-2 (25%) | R-AD | PA (60%) CPA-2 (40%) | EVOH (85%) EAMA (15%) | R-AD | PEC (75%) EAO-2 (25%) |
| % thickness | 25.81 | 16.13 | 6.45 | 9.68 | 16.13 | 25.81 |
| Ex. 10 | PEC (75%) EAO-2 (25%) | R-AD | PA (60%) CPA-2 (40%) | EVOH (85%) EAMA (15%) | R-AD | PEC (75%) EAO-2 (25%) |
| % thickness | 24.24 | 15.15 | 12.12 | 9.09 | 15.15 | 24.24 |
| Ex. 11 | PEC (75%) EAO-2 (25%) | R-AD | PA (60%) CPA-3 (40%) | EVOH (85%) EAMA (15%) | R-AD | PEC (75%) EAO-2 (25%) |
| % thickness | 24.24 | 15.15 | 12.12 | 9.09 | 15.15 | 24.24 |

-continued

| | |
|---|---|
| PET | KODAK PETG COPOLYESTER 6763 (™) polyethylene terephthalate, obtained from Eastman Plastics, of Houston, Texas. |
| CPA-2 | GRILON CF62BSE (™) nylon 6/69 copolymer, obtained from EMS American Grilon, Inc., of Sumter, S.C. |
| CPA-3 | GRILON CF6S (™) nylon 6/12 copolymer, obtained from EMS American Grilon, Inc., of Sumter, S.C. |
| EVOH | EVAL LC-E105A (™) ethylene vinyl alcohol copolymer, obtained from Eval Company of America, of Lisle, Illinois. |
| R-AD | TYMOR (™) 1203 (™) rubber modified, maleic anhydride grafted ethylene alpha-olefin copolymer, obtained from Morton International Specialty Chemical Company, of Chicago, Illinois |
| PEC | FINA 8473 (™) propylene ethylene copolymer having 3.1% by weight of ethylene, obtained from Fina Oil and Chemical Company, of Deerpark Texas |
| EAO-1 (and LLDPE #1) | DOWLEX 2045 (™) ethylene/1-octene copolymer, obtained from the Dow Chemical Company, of Midland, Michigan |
| EAO-2 | TAFMER A-4085 (™) ethylene butene copolymer, obtained from Mitsui Petrochemical Ltd., of New York, New York |
| EAMA | LOTADER 3200 (™) ethylene acrylic acid maleic anhydride terpolymer, obtained from Elf Atochem North America, of Philadelphia. |

The cook-in films of Examples 1–10 were all oriented out of hot water at approximately 208° F. in a trapped bubble process as described above.

The cook-in films of Examples 1–4 were coated with mineral oil and cook-tested. Three cook-tests were conducted. Sample casings of each film were filled with water, a water/oil mixture, and water massaged ham, respectively, and subjected to standard cook-in conditions. All samples survived the cook-tests and yielded acceptable end products.

The cook-in films of Examples 5 and 6 were coated with mineral oil, shirred and cook-tested. Three cook-tests were conducted. Sample casings of each film were filled with water, a water/oil mixture, and water massaged ham, respectively, and subjected to standard cook-in conditions. All samples survived the cook-tests and yielded acceptable end products.

EXAMPLE 12
(Substantially 100% Polyolefin: COMPARATIVE FILM)

A 3⅜-inch (lay-flat width) tape was produced by the coextrusion process used in Example 1, above, wherein the chemical composition of the tape cross-section was as follows:

| ACC | / 60% LLDPE#1 40% EVA #2 | / 65% EVA#2 35% LLDPE#1 |
|---|---|---| and wherein the thickness of these tape layers was 6 mils/mils/6 mils. All of the resins were extruded between 380° F. and 450° F., and the die was at approximately 400° F. The extruded tape was cooled with water and flattened. The lay-flat tubing width was 3⅜ inches. The tape was then passed through a scanned beam of an electronic crosslinking unit, where the tape received a total dosage of 57 kGy. After irradiation, the flattened tape was passed through hot water having a temperature of from 206° F.–210° F. Immediately upon emerging from the hot water, the heated tape was inflated into a bubble, and oriented into a film tubing which had a layflat width of 9 inches, and a total thickness of 2.3 mils. Another tape was oriented to produce a film tubing having a total thickness of 3.0 mils. Both of the resulting films had a free shrink of about 20 percent in the longitudinal direction, and about 30% free shrinkage in the transverse direction, when immersed in hot water at 185° F., using ASTM method D 2732-83.

The resulting film tubings were then shirred, with mineral oil applied to the outside surfaces thereof. The resulting shirred casings were stuffed with meat emulsion and then cooked at up to 170° F. for several hours in a high humidity environment. The resulting casings were found to have an unacceptable level of splitting during the cook-in test. That is, about 23% of the 2.3 mil casings, and about 23% of the 3.0 mil casings, split during cook-in. The splits were mostly "longitudinal splits", i.e., splits in the machine direction.

EXAMPLE 13
(Working Example Having PET Core Layer)

A 3.5 inch (lay-flat width) tape was produced by the coextrusion process used in Example 1, above, wherein the chemical composition of the tape cross-section was as follows:

| IONOMER | / 20% LLDPE#1 80% EVA#3 | / EVA-AM | / PET | / EVA-AM | / 20% LLDPE#1 80% EVA#3 |
|---|---|---|---|---|---| and wherein the thickness of these tape layers was, respectively, 3 mils/5 mils/1.2 mils/2.0 mils/1.2 mils/5 mils. All of the resins were extruded between 380° F. and 530° F., and the die was at approximately 420° F. The extruded tape was cooled with water and flattened. The lay-flat tubing width was 3.5 inches. The tape was then passed through a scanned beam of an electronic crosslinking unit, where the tape received a total dosage of 57 kGy. After irradiation, the flattened tape was passed through hot water having a temperature of from 206° F.–210° F. immediately upon emerging from the hot water, the heated tape was inflated into a bubble, and oriented into a film tubing which had a layflat width of 9 inches, and a total thickness of 3.0 mils. The resulting film had a free shrink of about 20 percent in the longitudinal direction, and about 30% in the transverse direction, when immersed in hot water at 185° F., using ASTM method D 2732-83.

The resulting film tubing was then coated with mineral oil, which was applied to the outside surface of the film tubing. The resulting film tubing was filled with a mixture of water and 0.1% mineral oil, and cooked at 180° F. for 12 hours with no delamination of the casing layers. Also, the oil-coated film tubing was stuffed with meat emulsion and then cooked at up to 170° F. for several hours in a high humidity environment. The resulting casings were found to survive the cook-in test, without splitting.

EXAMPLE 14
(7-Layer Film and Bag Made Therefrom)

A 3.5-inch (lay-flat width) tape is made by the coextrusion process used in Example 1, above, wherein the chemical composition of the tape cross-section is as follows:

| LLDPE#1 | / | 80% EVA#2 / 20% LLDPE#1 | / | R-AD | / | 80% PA#2 / 20% CPA-3 | / | EVOH | / | R-AD | / | 80% EVA#2 / 20% LLDPE#1 |
|---|---|---|---|---|---|---|---|---|---|---|---|---| and wherein the thickness of these tape layers is, respectively, 3 mils/5 mils/1.1 mils/2 mils/1.1 mils/1.1 mils/5 mils. All of the resins are extruded between 380° F. and 530° F., and the die is at approximately 420° F. The extruded tape is cooled with water and flattened. The lay-flat tape tubing width is 3.5 inches. The tape is then passed through a scanned beam of an electronic crosslinking unit, where the tape receives a total dosage of 57 kGy. After irradiation, the flattened tape is passed through hot water having a temperature of from 204° F.–210° F. Immediately upon emerging from the hot water, the heated tape is inflated into a bubble, the orientation process being carried out easily, i.e., without bubble breaks. In this manner, the heated tape tubing is oriented into a film tubing having a layflat width of 10 inches, and a total thickness of 2.3 mils. The resulting film has a free shrink of about 20 percent in the longitudinal direction, and about 30 percent in the transverse direction, when immersed in hot water at 185° F., using ASTM method D 2732-83. The resulting film is used to make end-seal bags and side-seal bags, using a heat seal or any other appropriate sealing mechanism.

EXAMPLE 15
(Comparative Film Having a Nylon Layer Thicker Than 20%)

A 3.5-inch (lay-flat width) tape is made by the coextrusion process used in Example 1, above, wherein the chemical composition of the tape cross-section is as follows:

| IONOMER | / | 80% EVA#2 / 20% LLDPE#1 | / | R-AD | / | 90% PA#2 / 10% CPA-3 | / | R-AD | / | 80% EVA#2 / 20% LLDPE#1 |
|---|---|---|---|---|---|---|---|---|---|---| and wherein the thickness of these tape layers is, respectively, 3 mils/5 mils/1 mil/4 mils/1 mil/4 mils. All of the resins are extruded between 380° F. and 530° F., and the die is at approximately 420° F. The extruded tape is cooled with water and flattened. The lay-flat tape tubing width is 3.5 inches. The tape is then passed through a scanned beam of an electronic crosslinking unit, where the tape receives a total dosage of 57 kGy. After irradiation, the flattened tape is passed through hot water having a temperature of from 204° F.–210° F. Immediately upon emerging from the hot water, attempts are made to blow a bubble from the heated tape, i.e., to orient the tape, but orientation is determined to be very difficult, or impossible, due to bubble breakage.

The foregoing description of preferred embodiments of the invention have been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A process of making a biaxially-oriented multilayer film, comprising:
   (A) extruding a tubular multilayer tape comprising:
      (i) a first layer comprising a composition consisting essentially of a first polyamide and a second polyamide, wherein the first polyamide is a crystalline polyamide and wherein the second polyamide is a crystalline copolyamide, wherein the second polyamide has a different crystal structure than the first polyamide, and the first layer has a thickness of from about 2 to 12 percent, based on a total thickness of the tape;
      (ii) a second layer comprising a first polyolefin;
      (iii) a third layer which is an $O_2$-barrier layer comprising at least one member selected from the group consisting of ethylene/vinyl alcohol copolymer, polyvinylidene chloride, and polyalkylene carbonate, the third film layer having a thickness of less than about 15 percent, based on a total thickness of the tape;
      (iv) a fourth layer comprising a second polyolefin;
   (B) inflating the tape so that the tape is biaxially oriented by stretching in a transverse direction and machine direction, so that a tubular multilayer film is formed.

2. The process according to claim 1, wherein the composition comprises the first polyamide in an amount of from about 10 to 95 percent, based on the weight of the composition.

3. The process according to claim 1, wherein the composition comprises the first polyamide in an amount of from about 60 to 95 percent, based on the weight of the composition.

4. The process according to claim 1, wherein the composition comprises the first polyamide in an amount of from about 85 to 95 percent, based on the weight of the composition.

5. The process according to claim 1, wherein the $O_2$-barrier layer comprises ethylene/alcohol copolymer, and wherein the second layer is between the third layer and the fourth layer, and the fourth layer is an inside layer of the tubing.

6. The process according to claim 5, wherein:

the first polyolefin comprises at least one member selected from the group consisting of polyethylene homopolymer, polypropylene homopolymer, polybutylene homopolymer, ethylene/alpha-olefin copolymer, propylene/alpha-olefin copolymer, butene/alpha-olefin copolymer, ethylene/unsaturated ester copolymer, ethylene/unsaturated acid copolymer; and the second polyolefin comprises at least one member selected from the group consisting of polyethylene homopolymer; polypropylene homopolymer, polybutylene homopolymer, ethylene/alpha-olefin copolymer, propylene/alpha-olefin copolymer, butene/alpha-olefin copolymer, ethylene/unsaturated ester copolymer, ethylene/unsaturated acid copolymer.

7. The process according to claim 6, wherein the tube further comprises the fifth layer which comprising a third polyolefin which comprises at least one member selected from the group consisting of ethylene/alpha-olefin copolymer, ethylene/unsaturated ester copolymer, and ethylene/unsaturated acid copolymer, and wherein the third layer is between the fourth layer and the fifth layer.

8. The process according to claim 7, wherein the tube further comprises a sixth layer and a seventh layer, wherein:

the sixth layer comprises at least one member selected from the group consisting of anhydride grafted polyolefin and acid modified polyolefin;

the seventh layer comprises at least one member selected from the group consisting of anhydride grafted polyolefin and acid modified polyolefin; and the sixth layer is between the second layer and the third layer, and the seventh layer is between the third layer and the fifth layer.

9. The process according to claim 8, wherein the third layer is between the fourth layer and the fifth layer.

10. The process according to claim 1, wherein biaxial orientation is carried out at an orientation temperature of from about 180° F. to 280° F.

11. The process according to claim 10, wherein biaxial orientation is carried out at an orientation temperature of from about 160° F. to 205° F.

12. The process according to claim 11, wherein the tube is heated in hot water immediately before biaxial orientation.

13. The process according to claim 12, wherein biaxial orientation is carried out at an orientation temperature of from about 180° F. to 205° F.

14. The process according to claim 13, wherein the tube is heated with water having a temperature of from about 185° F. to 212° F., for a time of from about 3 to 50 seconds.

15. The process according to claim 14, wherein the film has a total free shrink of from about 5 to 140 percent.

16. The process according to claim 15, wherein the film has a total free shrink of from about 10 to 80 percent.

17. The process according to claim 16, wherein the film has a total free shrink of from about 20 to 60 percent.

18. The process according to claim 1, further comprising the step of coating an outside surface of the tubular multilayer film with oil.

19. The process according to claim 1, wherein the second polyamide is selected from the group consisting of nylon 6/12, nylon 6/69, nylon 66/610, and mixtures thereof.

* * * * *

UNITED STATES PATENT AND TRADEMARK OFFICE
CERTIFICATE OF CORRECTION

PATENT NO.    : 6,203,750 B1
DATED         : March 20, 2001
INVENTOR(S)   : Ryotaro Magoshi It is certified that error appears in the above-identified patent and that said Letters Patent is hereby corrected as shown below:

<u>Title page,</u>
Item [73], Assignee, should read -- Mitsubishi --

Signed and Sealed this

Twenty-fifth Day of May, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,203,750 B1
DATED : March 20, 2001
INVENTOR(S) : Kelly R. Ahlgren et al.

It is certified that error appears in the above-identified patent and that said Letters Patent is hereby corrected as shown below:

This certificate supersedes Certificate of Correction issued May 25, 2004, the number was erroneously mentioned and should be vacated since no Certificate of Correction was granted.

Signed and Sealed this

Tenth Day of August, 2004

JON W. DUDAS
*Acting Director of the United States Patent and Trademark Office*